United States Patent

Smith

[15] 3,691,868
[45] Sept. 19, 1972

[54] ADJUSTABLE PEDAL

[72] Inventor: Raymond P. Smith, 30785 Red Maple Lane, Southfield, Mich. 48076

[22] Filed: July 6, 1971

[21] Appl. No.: 159,865

[52] U.S. Cl. ..................74/512, 74/519, 74/560
[51] Int. Cl. ..............................................G05g 1/14
[58] Field of Search..74/512, 519, 560, 89.22, 89.21, 74/89.2, 89.15

[56] References Cited

UNITED STATES PATENTS

| | | | |
|---|---|---|---|
| 3,282,125 | 11/1966 | Dully | 74/560 |
| 3,643,524 | 2/1971 | Herring | 74/512 |

Primary Examiner—William F. O'Dea
Assistant Examiner—F. D. Shoemaker
Attorney—Keith L. Zerschling et al.

[57] ABSTRACT

An adjustable pedal assembly for an automotive vehicle in which the fore and aft positions of the pedals may be varied without affecting the outputs of the individual pedal components. The assembly includes a pedal carrier bracket which is connected by links to a support structure. Each pedal is connected to its controlled device by a flexible tension bearing member. The flexible tension bearing member extends about a guide mounted on one of the links. The guide is located at an intermediate point on the link so that it compensates for the change in position of the pedal without affecting the output of the flexible member.

7 Claims, 5 Drawing Figures

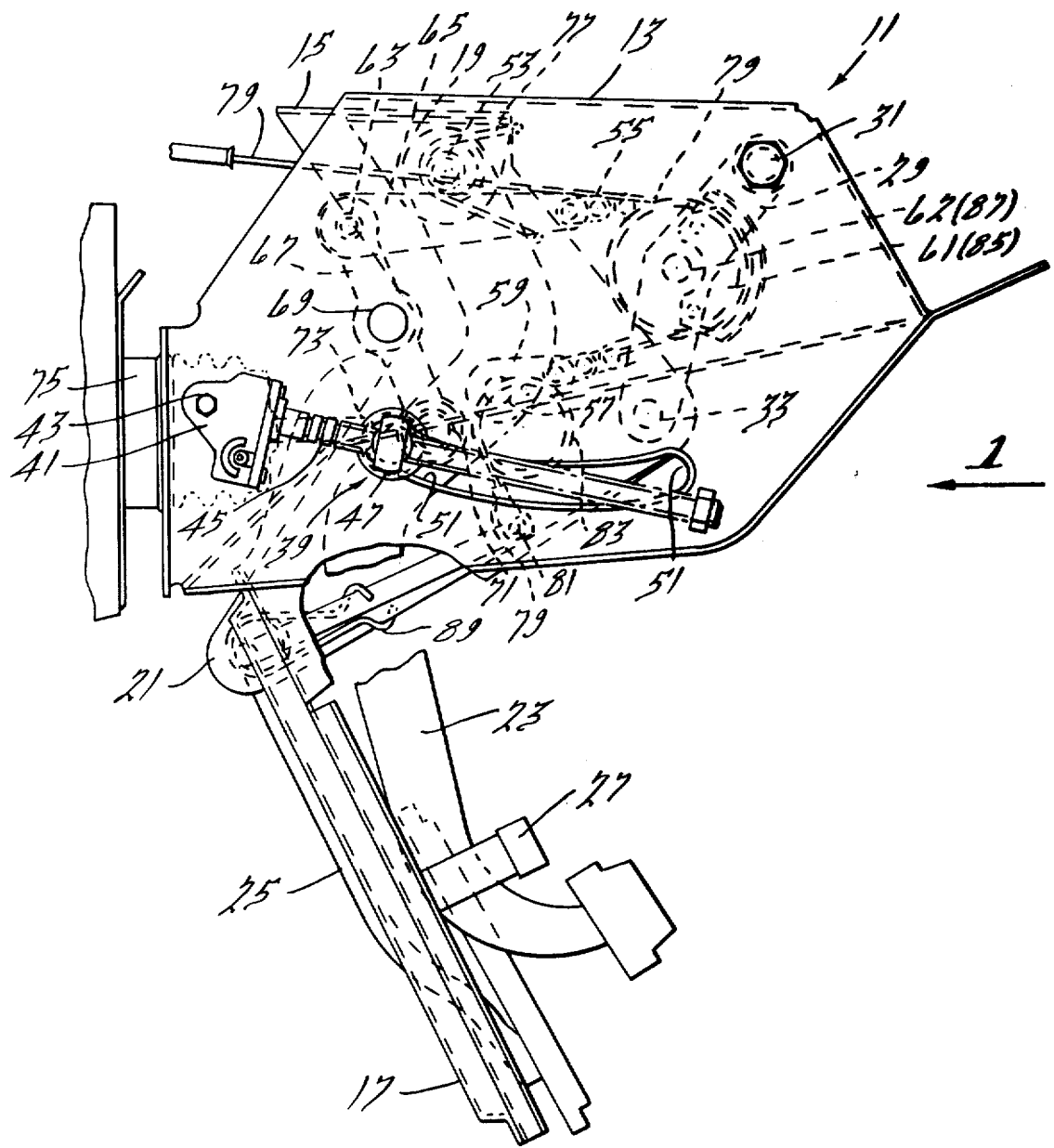

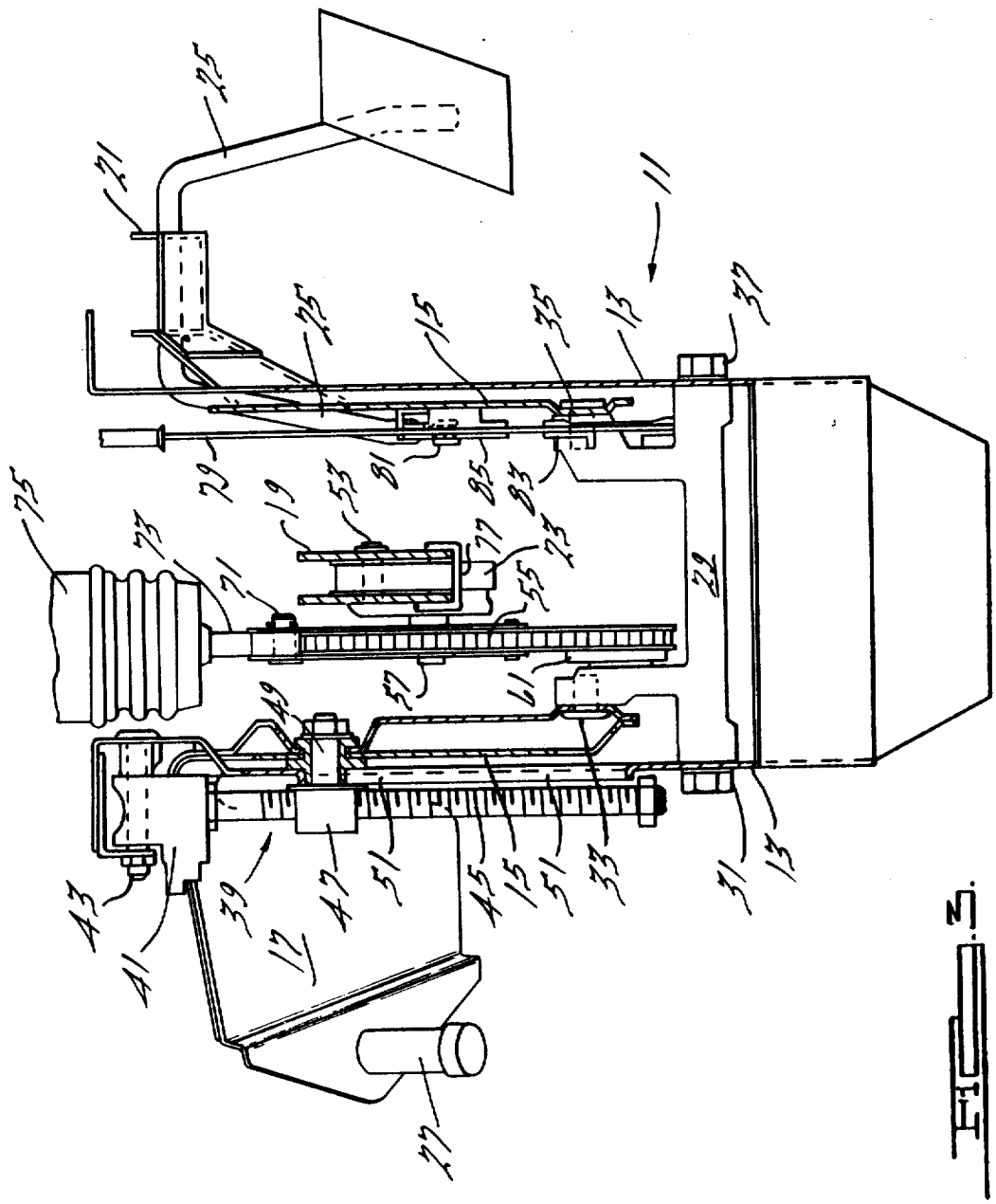

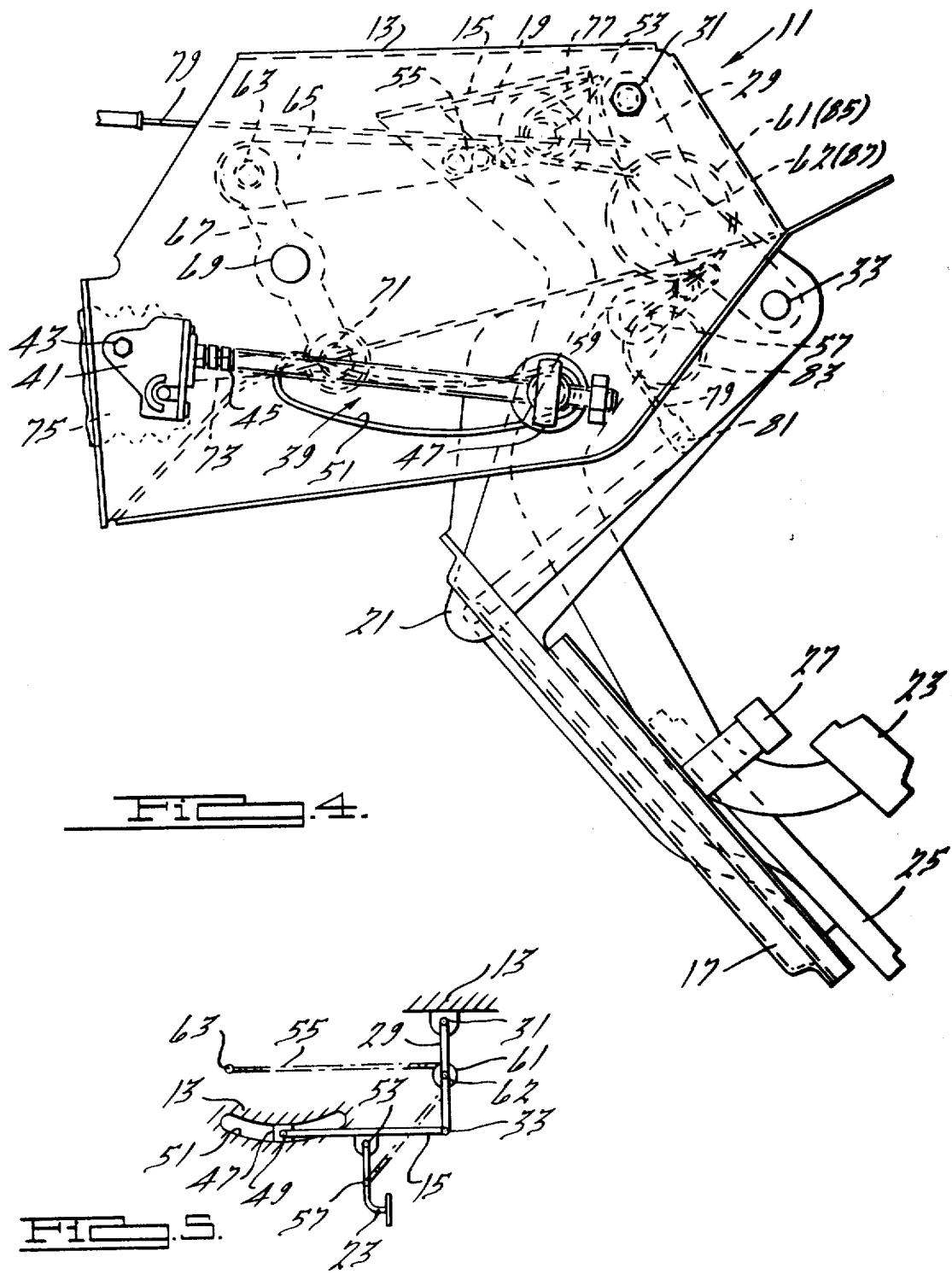

3,691,868

ADJUSTABLE PEDAL

BACKGROUND AND SUMMARY OF THE INVENTION

In a conventional automotive vehicle, pedals are provided for controlling the brakes and the engine throttle. If the vehicle has a manual transmission, a clutch pedal is also provided. These pedal controls are foot-operated by the driver. In order for the driver to obtain the most advantageous position for working these controls, the vehicle front seat is usually slidably mounted on a seat track with means for retaining the seat along the track in a number of set positions.

The adjustment provided by moving the seat along the seat track does not accommodate all vehicle operators due to differences in anatomical dimensions. Therefore, the present invention provides improvement over conventional vehicles by providing pedal controls that are adjustable so that the driver may select the spacing between the seat, the steering wheel, and the pedal which will best accommodate the dimensions of his legs and arms.

It has been proposed for various reasons to design automotive vehicles with fixed seats or seats adjustable only in vertical directions. In such vehicles, the necessity of pedals which are adjustable in fore and aft directions is readily apparent.

This invention provides a pedal assembly in which the normal positions of pedal levers are adjustable in fore and aft directions but in which the pedal component outputs are not affected by the adjustment. The invention further provides an adjustable pedal assembly which utilizes a simple pedal lever rather than a parallelogram or trapezoidal linkage as has been proposed in the prior art. The adjustable pedal assembly described in the latter portions of this disclosure provides a mechanism which may be installed in a present day automotive vehicle without significant change in the location of the controlled devices. The invention further provides an adjustable pedal assembly in which the pedal levers pivot from the uppermost portion of the assembly to permit maximum lever length and more nearly straight travel of the pedal pads. Furthermore, the invention provides a construction which is economical in design and reliable in operation.

An adjustable pedal assembly constructed in accordance with this invention includes a first link pivotally interconnecting a support structure and a point on a second link. A second point on the second link is located relative to the support structure by a positioning means, movement of which varies the position of the links relative to the support structure. The second link functions as the pedal lever carrier bracket. The pedal lever is interconnected with its controlled mechanism by a chain or cable or similar means which extends from the pedal lever, about a guide or pulley mounted on the first link and to the controlled mechanism. The guide is so located on the first link that adjustment movement of the pedal carrier bracket relative to the support bracket does not affect output of the flexible tension-bearing motion transfer means. The guide functions as an automatically adjustable, yet solidly mounted "chain tightener."

BRIEF DESCRIPTION OF THE DRAWINGS

FIG. 2 is a side elevational view taken in the direction of arrow 2 shown in FIG. 1; the pedals are shown in their most forward disengaged positions to accommodate a taller driver.

FIG. 3 is a cross sectional view taken along line 3—3 of FIG. 1.

FIG. 4 is a side elevational view similar to FIG. 2, but showing the pedals position adjusted in their most rearward disengaged positions to accommodate a shorter driver.

FIG. 5 is a simplified schematic side view analogous to FIGS. 1 and 4 of the drawings.

DETAILED DESCRIPTION OF A PREFERRED EMBODIMENT

Figure 1:
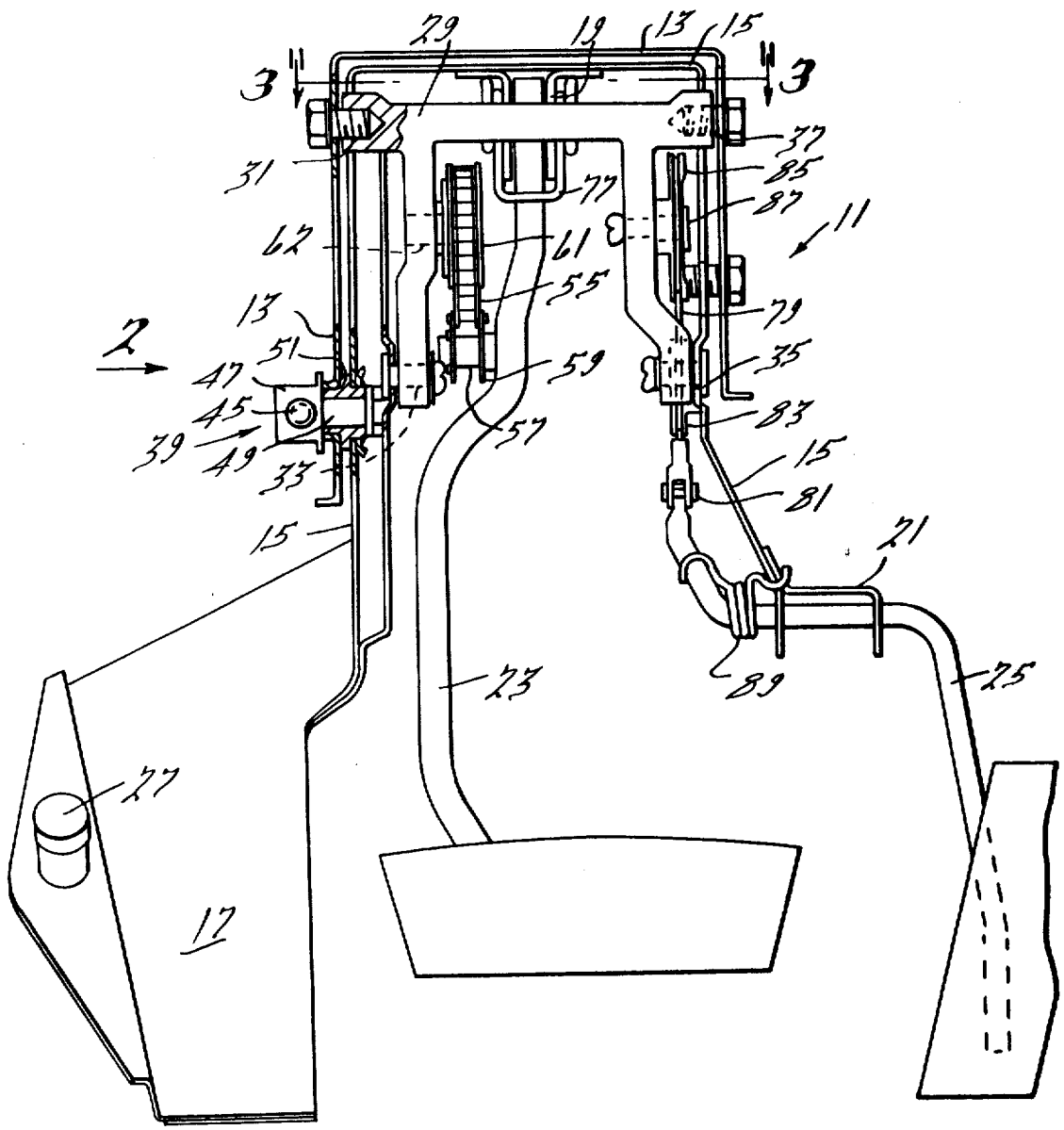
FIG. 1 is a front elevational view with portions in section of a pedal assembly constructed in accordance with the invention.

In the drawings reference numeral 11 refers generally to the adjustable pedal assembly. The assembly includes basically a support bracket 13 mounted to the body of an automotive vehicle, a pedal carrier or link 15 that is movable relative to the support bracket, means to movably and adjustably connect the pedal carrier bracket to the support bracket, pedal members pivotally suspended from the carrier and, finally, motion transfer means to transmit the motion from the pedal members to the controlled mechanism or components.

The support bracket 13 is fixed to a body member (not shown) of the vehicle. It has an inverted U-shaped cross section when viewed from the front as in FIG. 1.

The pedal carrier link 15 includes a U-shaped portion positioned within the support bracket 13. Carrier link 15 also includes a footrest portion 17 and mounts 19 and 21 for the brake pedal 23 and accelerator pedal 25, respectively. The footrest provides an adjustable location for the headlight dimmer switch 27.

The pedal carrier link 15 is connected to the support bracket 13 by link 29. The connections 31, 33, 35, and 37 between the link and the brackets are pivotable to permit movement of the carrier relative to the support bracket.

A second connection between the support bracket 13 and the pedal carrier link 15 is the adjustment mechanism 39. It comprises an electric motor 41 pivotally attached by pin 43 to the support bracket 13 or to a vehicle body member fixed relative to the support bracket, a threaded worm or screw 45 rotatable by the electric motor, and a nut 47 engageable with the worm and pivotally connected by stud 49 to the carrier link. As the worm is rotated the nut travels along its length and adjusts the position of the pedal carrier link 15 relative to the support bracket 13. An additional constraint is placed on the nut 47 and stud 49 in that its path is prescribed by a contoured guide or slot 51 formed in the support bracket. The attitude and contour of the slot determine the path made by the pedal pads during the range of adjustment.

FIG. 5 of the drawings is a schematic simplification of the invention for the purposes of explanation. The invention is compared to a crank and slider mechanism in which functionally equivalent or nearly equivalent elements are identified by identical reference numerals.

The brake pedal 23 is pivotally suspended from the carrier link 15 by mount 19 and pin 53. A roller chain 55 is attached to the pedal lever by stud 57 and link 59 and extends about an idler sprocket or guide 61 mounted by stud 62 on link 29 approximately midway between the connections 31 and 37 as viewed in FIG. 2. The chain then extends forwardly toward the engine compartment (not shown) of the vehicle and is connected by pin 63 and link 65 to one end of a lever 67 that is pivotally mounted on a stud 69 fixed to support member 13. The other end of lever 67 is connected by pin 71 to the control arm 73 of a brake master cylinder 75. Chain tension is maintained by spring 77 positioned about pin 53. The master cylinder includes a spring (not shown) which acts to bias the pedal into normal brake disengaged position.

The accelerator pedal 25 is pivotally attached to the carrier link 15 by the mount 21. The shape of the pedal lever and its mount 21 are best shown in FIG. 1 of the drawings. A cable 79 is connected to the accelerator pedal lever by pin 81 and extends about a first idler pulley or guide 83, a second idler pulley or guide 85 and then toward the engine compartment where it is fastened to the carburetor throttle control lever (not shown). The pulley 85 is rotatably mounted on link 29 by pin 87. Further, pulley 85 is coaxial with sprocket 61 and has an identical effective radius. Cable tension is maintained by spring 89 positioned about a portion of the pedal lever adjacent its mount 21. An accelerator pedal return spring (not shown) is located within the engine compartment and acts in opposition to spring 89 to bias the pedal toward a normal, throttle-closed position.

OPERATION

The pedals 23 and 25 are shown in the drawings in their normal disengaged positions. These positions are adjustable in fore and aft directions to accommodate various size drivers. FIG. 2 of the drawings shows the pedals in positions to accommodate tall drivers; FIG. 4 shows the position to accommodate shorter drivers.

Adjustment is accomplished as follows. Motor 41 rotates worm 45 causing slider nut 47 to traverse slot 51 from its forward position of FIG. 2 toward its rearward position and cause the pedal pads to be displaced rearwardly. During the course of the adjustment, the pedal levers 23 and 25 are not displaced relative to their carrier link.

The pedals are operated by forward depressions from their normal positions as shown in the drawings. The brake pedal 23 pivots about pin 53. Its displacement is transmitted by chain 55 and lever 67 to master cylinder 75. The accelerator pedal 25 pivots about a horizontal portion of itself extending through mount 21. Its displacement is transmitted by cable 79 to the throttle control lever (not shown) of the engine.

The outputs of the brake and accelerator linkages are unaffected by the adjustment described previously. Consider, for example, the brake actuating linkage. For that linkage to be unaffected by pedal position adjustment, point or pin 63 in the linkage must remain constant or fixed relative to support member 13. This is accomplished by the placement of an idler sprocket or guide 61 on link 29 approximately midway between its two connections 31 and 33. As the pedal 23 and its carrier link 15 are displaced forwardly, the end of chain 55 connected to the pedal by pin 57 is displaced a similar amount. The sprocket 61 functions as an idler means and for the given geometry is displaced about half the distance of pin 57. The exact location of the gear 61 on link 29 may be analytically or empirically located for a linkage of given dimensions and restraints.

The accelerator pedal linkage functions similarly. It may be noted from FIGS. 2 and 4 of the drawings that the cable pulleys 83 and 85 place the cable 79 and the chain 55 in superimposed or nearly superimposed positions for much of their lengths.

Modifications and alterations may occur to those skilled in the art which are included within the scope of the following claims.

I claim:

1. An adjustable position control linkage assembly for interconnecting a control lever and a controlled device, comprising
   a support structure,
   a linkage connected to said support structure including
   a first link pin-joined to said support structure,
   a second link having a first point pin-joined to the first link,
   connecting means joining a second point on the second link and the support structure,
   adjustment means constructed to vary the position of said second link relative to said support structure,
   a control lever pivotally attached to said second link for movement relative thereto,
   a flexible tension-bearing motion transfer means interconnecting said control lever and the controlled device,
   guide means attached to said first link between its pin-joined connections,
   said flexible means extending toward said guide, about a portion of its periphery and toward a connection with the controlled device,
   said guide being positioned on said first link so that upon adjustment of the linkage relative to the support structure the guide will compensate for displacement of the connection of the flexible member with the control lever while simultaneously preventing significant displacement of the connection of the flexible means with the controlled device.

2. An adjustable pedal assembly for controlling an external, controlled mechanism comprising:
   a support structure
   a crank and slider type linkage including
   a first link pivotally attached to said support structure
   a second link having one point pivotally attached to said first link,
   a slider pivotally connected to said second link at a second point thereon,
   a first guide fixed relative to said support structure defining a path in which said slider may move,
   adjustment means connected to said linkage being operable to vary the positions of said first and second links and slider relative to said support structure, a pedal lever pivotally attached to said second link and having a normal position relative thereto, a flexible tensile, motion transfer means interconnecting a point on the pedal lever and the controlled mechanism, a second guide mounted on said first link, said motion transfer means extending about said guide so that its direction is substantially reversed, said second guide located at an intermediate position on said first link in which it accommodates for the operation of the adjustment means and maintains the point of connection of the motion transfer means and the controlled mechanism in a substantially fixed location relative to the support structure.

3. An assembly according to claim 2:

said adjustment means comprising a rotatable screw and a nut engageable with said screw, said nut connected to said slider to move therewith.

4. An assembly according to claim 2:

said second guide comprising a sprocket rotatably mounted on said first link, said motion transfer means comprising chain means engagable with said sprocket.

5. An assembly according to claim 2:

said second guide comprising a pulley rotatably mounted on said first link, said motion transfer means comprising a cable engagable with said pulley.

6. An assembly according to claim 2:

said first guide comprising a contoured slot formed in said support structure.

7. An assembly according to claim 2:

said adjustment means comprising a rotatable screw and a nut engageable with said screw, said nut connected to said slider to move therewith, said first guide comprising a contour slot formed in said support structure, said slider being receivable within said slot.

* * * * *

UNITED STATES PATENT OFFICE
CERTIFICATE OF CORRECTION

Patent No. 3,691,868          Dated September 19, 1972

Inventor(s) Raymond P. Smith

It is certified that error appears in the above-identified patent and that said Letters Patent are hereby corrected as shown below:

On the cover sheet, insert -- [73] Assignee  Ford Motor Company, Dearborn, Michigan, a corporation of Delaware -- .

Signed and sealed this 8th day of May 1973.

(SEAL)
Attest:

EDWARD M. FLETCHER, JR.　　　　　　　　ROBERT GOTTSCHALK
Attesting Officer　　　　　　　　　　　Commissioner of Patents